July 5, 1955  J. E. BAYHA  2,712,172
METHOD AND APPARATUS FOR MAKING VARIABLE CAPACITORS
Filed Aug. 24, 1953  2 Sheets-Sheet 2

INVENTOR.
Jack E. Bayha
BY Darby & Darby
HIS ATTORNEYS.

United States Patent Office 2,712,172
Patented July 5, 1955

2,712,172

METHOD AND APPARATUS FOR MAKING VARIABLE CAPACITORS

Jack E. Bayha, South Ozone Park, N. Y., assignor to Emerson Radio and Phonograph Corporation, New York, N. Y., a corporation of New York Application August 24, 1953, Serial No. 376,180

9 Claims. (Cl. 29—25.41)

The present invention relates to the manufacture of variable capacitors and especially to the manufacture of ganged variable capacitors having the plates thereof made of a dielectric material with a conductive area thereon, this conductive area being placed upon the dielectric material by either stamping, printing, or etching.

At the present time ganged variable capacitors are widely used for tuning of radio and television receivers and the like. The type of capacitors in most general use comprises a series of rotor plates interspersed with a series of stator plates, the dielectric being air. In ganged capacitors it is necessary that means be provided for an adjustment of the capacity of at least one of the capacitors of the gang so that the variation in capacity of the various capacitors will have a definite relation to the variation of other capacitors of the gang. With air capacitors this is accomplished by notching the periphery of at least one of the rotor plates and bending the portion between notches to adjust the capacity of that condenser with relation to the capacity of the other of other condensers of the gang.

Because of the necessity of making this adjustment it has been impossible to utilize what may be termed printed circuit capacitors in place of the air capacitors above-mentioned since no means has been available for adjusting one or more of the capacitors in order that it may "track" with the remaining capacitors of the gang.

My invention comprises a means for utilizing such printed circuit capacitors and for adjusting the capacity of such capacitors so that they will track properly with other capacitors of the gang.

It is an object of the invention to provide means for producing variable capacitors comprising plates of dielectric material such as ceramic, plastic, etc., having conductive areas thereon, the conductive areas being in the same general form as the plates of air condensers presently manufactured.

It is another object of the invention to provide such capacitors which may be arranged for simultaneous operation and tuning of a number of circuits and in which the capacitors may be readily adjusted in the course of manufacture so that the variations of capacity, as the common operating means is actuated, will be in accordance with a definite proportion, that is, so that the various capacitors of the gang will track.

It is another object of the invention to provide means for effecting the tracking adjustment which are automatically operable and which are accurate and at the same time economically built and operated.

Other objects and features of the invention will be apparent when the following description is considered in connection with the annexed drawings, in which, Figure 1 is a perspective view of a mechanism for adjusting the capacity of one of two ganged capacitors with respect to the second capacitor of the gang at various positions of rotation of the rotor plates of the two capacitors. This figure includes a schematic diagram of the circuit connections of the capacitors to a capacitance bridge and to the operating solenoids of the unit;

Figure 1:
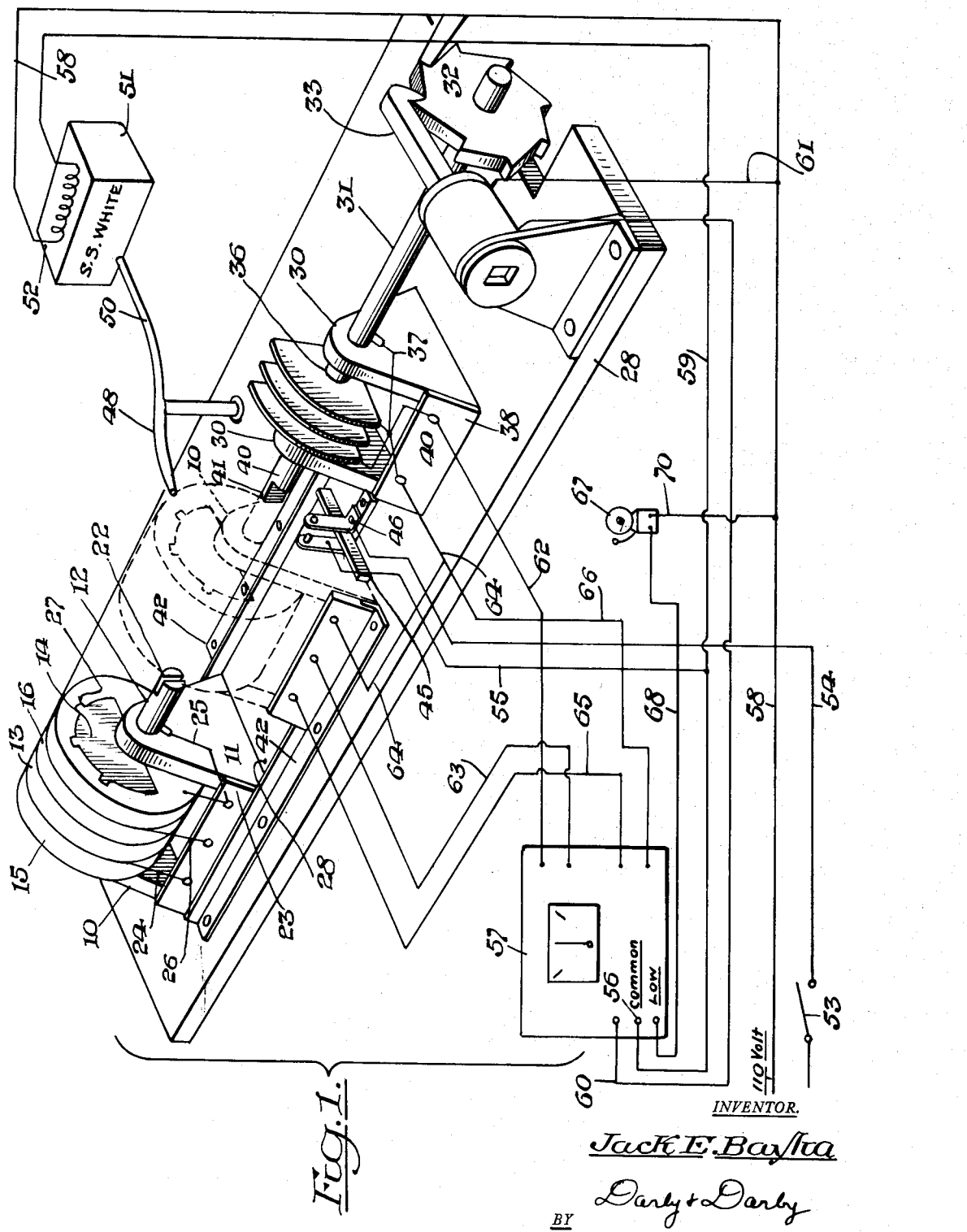

As has been indicated, a ganged capacitor having ceramic or like dielectric is constructed in a manner generally similar to the mode of constructing the present air dielectric capacitors. Referring to Figure 1 two end members 10 are provided these members being suitably spaced apart and having sloping sides. Rotatably mounted in the end members 10 is a shaft 12 on which the rotor disks 13 and 14 of the two capacitors are fixed. It will be understood that additional capacitors might be ganged together but the present construction is illustrative and is intended for utilization for conjoint tuning of an antenna circuit and an oscillator circuit which together provide the input signal to the intermediate frequency amplifying stages of a radio or television receiver or the like.

Figure 2:
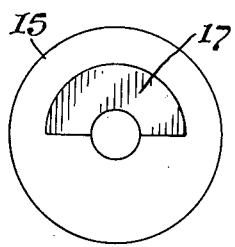
Figures 2, 3, 4 and 5 are respectively elevational views of the first capacitor stator, first capacitor rotor, second capacitor stator and second capacitor rotor.
Figure 4:
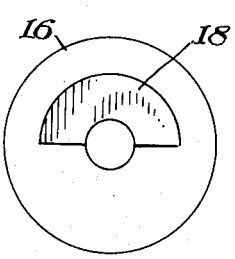

Each rotor 13 or 14 cooperates with an adjacent stator 15 and 16 respectively, the rotor 13 and the stator 15 together forming the antenna capacitor and the rotor 14 and stator 16 the oscillator capacitor. The stator plates 15 and 16 comprise relatively thick disks of material of relatively low dielectric strength having generally arcuately shaped conductive areas printed, stamped or etched thereon, these areas being designated 17 and 18 in Figures 2 and 4 respectively. These stator plates are of course fixed with respect to the frame comprising the end plates 10.

Figure 3:
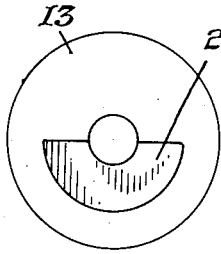
Figure 5:
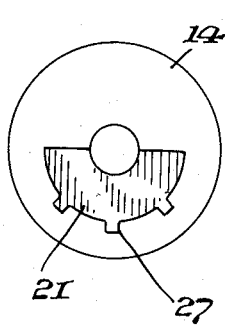

In a similar manner the capacitor rotors 13 and 14 are formed of disks of dielectric material, such as a ceramic material, having the arcuately shaped conductive portions 20 and 21 respectively (Figures 3 and 5), printed, etched or stamped thereon.

Shaft 12 is formed with a slot 22 in its end in any suitable manner to receive a manually operable knob. Likewise in the usual manner a terminal strip 23 extends between the end plates 10 and has leads to the plates of the capacitor insulatingly fixed thereto so that the ganged capacitor may be connected in the desired circuit. In the present instance the lead 24 connects to the stator 15 of the antenna condenser, the lead 25 to a brush bearing against the shaft 12 forming a common connection through the shaft 12 to the rotors 13 and 14 of the antenna and oscillator capacitors and the lead 26 connects to the stator 16 of the oscillator capacitor.

As has been indicated in order to make it practical to utilize a condenser as above described it is necessary that the capacity of one of the two capacitors forming the gang be adjusted so that the capacitors will track and properly perform the circuit tuning operation. In order to accomplish this result, the rotor 16 of the oscillator capacitor is provided with the radially projecting rectangular areas 27 (see Figures 1 and 5), these areas serving to increase the capacity of the oscillator capacitor so that it exceeds the required capacity in all positions of the shaft 12, and means are provided for abrading away portions of or all of the projections 27 until the capacity is that desired.

Figure 6:
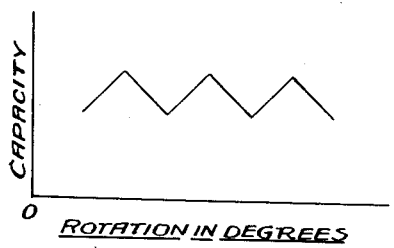
Figure 6 is a curve showing capacitance as a function of the rotation of the rotor of the capacitor.
Figure 7:
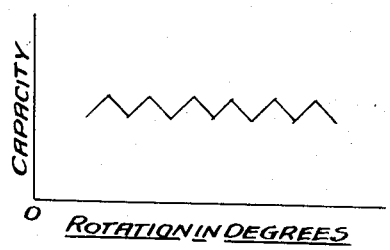
Figure 7 is a curve similar to Figure 6, but showing the capacity-rotation curve after certain protrusions of the rotor have been abraded.

In Figure 6 there is shown a curve of capacity versus rotation of the capacitor shaft for the oscillator capacitor prior to any abrading of the projections 27. It will be seen that there is a considerable variation in capacity as the capacitor rotor is rotated. Figure 7 shows a similar curve after abrasion has occurred. It will be noted from this curve that the variation is much less being well within the permissible variation for such tuning capacitors.

As will be clear from the above, each ganged capacitor must be arranged to have the rotors thereof indexed to various positions and to have the conductive area of one of the capacitors abraded to reduce the capacity to the desired value. In order to effect this result there is provided a table 28 on which there is mounted a pair of brackets 30 which brackets support a shaft 31 for rotary movement. Shaft 31 has fixed thereto at one thereof a ratchet wheel 32 with which a pawl 33 cooperates for indexing movement of the shaft 31. Pawl 33 is formed integrally with the core of a solenoid 34 so that as the solenoid is energized and deenergized the shaft is indexed. There is, of course, provided a spring-actuated detent pawl 35 which holds the shaft in a position to which it has been set.

Between the supporting brackets 30 an air dielectric capacitor 36 is provided, the rotor and stator plates of this capacitor being so shaped that at any indexed position the capacity equals the desired difference between the capacity of the antenna capacitor and the oscillator capacitor. As is common with such condensers the lead 37 from the stator plates is connected to a terminal on the terminal strip 38 and the lead 40 from the rotor plates is connected to a second terminal of this terminal plate 38. At the left end of shaft 31 there is provided a coupling having a protruding blade portion 41 adapted to fit slots 22 in the ends of capacitor shafts 12.

Mounted to the left of the brackets 30 on the table 28 is a pair of channel members or guides 42 which are spaced apart and inclined inwardly so that they receive capacitors to be adjusted. Mounted on one of these guides or adjacent thereto is a terminal strip 44 which cooperates with the terminal strip 23 and which thus connects the leads from the stator and rotor plates of the ganged capacitor into a circuit for controlling the abrading action.

Mounted to the right of the channel members 42 is a stop member 45 which locates the ganged capacitor with respect to the brackets 30 and of course the shaft 31 providing that the shaft 12 will be in exact alignment with the shaft 31 and that the blade 41 will engage the slot 22 when the ganged capacitor is positioned against the stop and between the channel members 42.

Mounted either on the stop member 45 or adjacent thereto is a bracket 46 carrying a pair of contacts 47 which contacts will be closed when a capacitor is inserted in the position just above described.

Mounted adjacent the position which the rotor plate 14 will occupy when the ganged capacitor is in its test position is a nozzle 48 which is connected by means of a hose 50 to a unit for providing air and sand under pressure. This unit is in common use and is known as the S. S. White abrading unit. It has been designated 51 in the drawings and the operation thereof is controlled by a solenoid forming part of the unit and designated 52.

The operation of the device thus far described can best be understood by reference to Figure 1, it being assumed that a ganged capacitor unit has been positioned as described between the channels 42 and against the stop 45 and with the blade 41 engaging the slot 22 in the shaft 12. It is also assumed that prior to placing the ganged capacitor in the position indicated the manually operated switch 53 had been closed so that when the capacitor reaches the position against the stop 45 and contacts 47 are closed a circuit is completed from the 110 volt source indicated through manually operated switch 53, conductor 54, contacts 47 and conductor 55 to the common terminal 56 of a capacitance bridge 57, thereby energizing the capacitance bridge which may, for example, be a "Clippard" capacitance bridge. At the same time a second circuit is completed extending from conductor 55 over conductor 59 to the solenoid 52 of the S. S. White abrader and thence through the winding of that solenoid and over conductor 58 to the opposite side of the A. C. source.

Since, as has been stated, the rotor 14 is intentionally manufactured so that its capacity is higher than that desired, it is obvious that the energization of the capacity bridge will cause the meter armature thereof to move to its high contact and therefore the circuit from the common terminal 56 will be extended over conductor 60 to the winding of solenoid 34 and thence over conductor 61 to conductor 58 and the opposite terminal of the alternating current source.

Due to the actuation of the abrader 51 a portion of the first of the projections 27 on the conductive area of the rotor 14 will be abraded away and as soon as the bridge 57 becomes balanced the meter armature will move away from the high contact thus deenergizing solenoid 34. Solenoid 34 is spring-biased and consequently the deenergization thereof will cause the pawl 33 to rotate the ratchet wheel 32 counterclockwise indexing the shaft 31 and with it the shaft 12 to a new position.

The capacitance bridge 57 previously described has its "standard" terminals connected by means of conductors 62 and 63 across the oscillator capacitor and the air dielectric capacitor 36, hereinafter termed the differential capacitor, in series, the series-connection including the conductor 64 which connects the rotor of the oscillator capacitor with the rotor of the differential capacitor. Connected across the unknown terminals of the bridge 57 by means of conductors 65 and 66 is the antenna capacitor and thus the capacity of the antenna capacitor is balanced against the series capacitance of the oscillator capacitor and the differential capacitor.

As the shaft 31, and with it the shaft 12, rotates to the new position, the capacity again rises beyond the desired degree and abrading material continues to flow through nozzle 38 and to abrade away a portion or all of the next projection of the series designated 27. Due to the rise in capacitance the bridge meter armature again moves against the high contact and the solenoid 34 is energized placing the pawl 33 in position to again index the shafts 31 and 12. This, however, does not occur until the capacity has been reduced to the desired degree and the armature of the bridge meter moves away from the high side and solenoid 34 is deenergized. When this occurs, another indexing step of the shafts immediately follows placing the third projection of the series 27 into place and causing the action to be repeated.

Although the conductive area 21 on the rotor plate 14 is intentionally made large by means of the projections 27 so that the capacity thereof will at no point be less than that desired, there is always a possibility that due to some error in the printing operation a particular capacitor will have a capacity lower than that desired. In order to assure that such a defective capacitor will not be placed into service, an alarm bell 67 is provided, this bell being connected by means of conductor 68 to the low contact of the meter of bridge 57 and by means of conductor 70 to conductor 58. Thus if the capacity bridge is unbalanced due to too low a capacity in the oscillator capacitor the bridge meter armature will move against the cooperating low contact and the bell 67 will be caused to ring.

When the device has been operated through 180° and the projections 27 abraded to the extent necessary to produce an oscillator capacitor having proper values at all of the indexed points the ganged capacitor is removed from the test position indicated and a new capacitor substituted therefor the operation then being repeated.

It will be understood that the testing and abrading arrangement above described may be extended to properly track two or more of the capacitors of a gang and furthermore that means may readily be provided for automatically placing the ganged capacitors in test position and for removing them therefrom. In addition, it may be desirable to separate those capacitors which are defective in that their capacity is too low from those which are acceptable and which have been abraded, such devices being merely refinements of the testing and abrading means above described which are not herein disclosed.

It will furthermore be understood that the arrangement of the testing and abrading device may be varied without in any way departing from the spirit of my invention. I wish therefore to be limited not by the foregoing description but, on the contrary, solely by the claims granted to me.

What is claimed is:

1. The method of manufacturing ganged variable capacitors having ceramic dielectric with capacitive areas printed thereon, which comprises, printing at least one of the ganged capacitors with radially extending conductive areas projecting beyond the normal outlines thereof, electrically comparing the capacity of said one capacitor with the capacity of other capacitors of the gang, and abrading away said projections until the compared capacities have a desired relationship.

2. The method of manufacturing ganged variable capacitors each having a stator and a rotor with conductive areas printed thereon forming capacities, which comprises, printing the conductive area of the rotor of one of the capacitors of said gang with radially extended portions projecting beyond the normal outlines thereof, electrically comparing the capacity of said capacitor with the capacity of other capacitors of the gang and abrading away said projections until said capacitors have capacity values of a desired relationship one to the other.

3. The method of manufacturing ganged variable capacitors having ceramic dielectric with capacitive areas printed on the rotors and stators thereof, which comprises, printing on the rotor of at least one of said capacitors a conductive area having radially extending portions projecting beyond the normal outlines thereof, said portions being angularly spaced, electrically comparing the capacity of said capacitor with the capacity of other capacitors of the gang at a particular angular position of the rotors of all capacitors of the gang, abrading away the particular projection at such angular position of said rotors, indexing said rotors to a new angular position, electrically comparing the capacities of said capacitors until a desired relationship between capacities is attained. and repeating said indexing and abrading until said capacitors have a desired relationship of capacity at all angularly spaced and indexed points.

4. The method of manufacturing ganged variable capacitors having ceramic dielectric rotor and stator elements each having conductive areas printed thereon, which comprises, printing on the rotor of one of said ganged capacitors a conductive area with radially extended portions projecting beyond the normal outlines thereof, connecting to said ganged variable capacitors a test capacitor having a capacity at different angular positions of the rotor thereof equal to the desired differences in capacity between two capacitors of said gang, electrically comparing the capacity of one of the capacitors of said gang with the combined capacity of the other capacitor of said gang and said differential capacity, indexing said ganged capacitors and said differential capacitor simultaneously and abrading away said projections at each indexed point until the capacity of said one ganged capacitor equals the algebraic sum of the capacities of said other ganged capacitor and said differential capacitor.

5. In a device for adjusting the capacity of one of a gang of ceramic dielectric capacitors to track with another capacitor of the gang, in combination, a shaft mounted for rotation, a coupling on said shaft, means for mounting a ganged capacitor for engagement of its shaft with said coupling, means for indexing said shaft to spaced angular positions, a capacitance bridge, means connecting one of said ganged capacitors as the standard for said bridge as the ganged capacitor shaft is engaged with said coupling, a differential capacitor having its rotor driven by said rotatably mounted shaft, means for connecting said differential capacitor and another capacitor of said gang in series as the unknown of said capacitance bridge as the ganged capacitor shaft is engaged with said coupling and means for abrading the rotor of one of said ganged capacitors at each indexed point until its capacity equals the algebraic sum of the capacitities of said other capacitor of said gang and said differential capacitor as determined by said capacitance bridge.

6. A device as claimed in claim 5 characterized in that said indexing means comprises a ratchet wheel mounted on said shaft and a solenoid actuated pawl engaging said ratchet wheel said bridge controlling said solenoid to actuate said wheel when the capacity of the standard and unknown are equal.

7. A device as claimed in claim 6 characterized in that said abrading means comprises a nozzle mounted adjacent the rotor of said one capacitor and further characterized in that said capacitance bridge is provided with a meter having contacts cooperating therewith said contacts completing a circuit to said indexing solenoid to actuate said solenoid when the capacity of said one capacitor equals the algebraic sum of the capacitities of said other capacitors and said differential capacitor.

8. A device as claimed in claim 7 characterized in that an alarm means is provided said alarm means being connected to said capacitance bridge meter to energize said means when the capacity of said one ganged capacitor is less than the sum of the capacities of said other ganged capacitor and said differential capacitor.

9. In a device for adjusting the capacity of one of a gang of ceramic dielectric capacitors, each having a rotor and a stator with inductive areas printed thereon, to track with another capacitor of the gang and in which the rotors are mounted on a common shaft rotatable with respect to the stators and connections to the rotors and stators are brought out to a terminal strip, in combination, a base, a shaft rotatably mounted on said base, a differential capacitor having a shaft, means connecting the differential capacitor shaft to said base-mounted shaft for rotation thereby, a coupling on said base-mounted shaft, means on said base for guiding a ganged capacitor unit into position with the shaft thereof in driven engagement with said coupling, contact means mounted on said base in position to engage the ganged capacitor terminal strip when the ganged capacitor is in said position, a capacitance bridge, circuit means including said contacts connecting one of the ganged capacitors as the unknown and another of the ganged capacitors in series with said differential capacitor as the standard of said bridge, a nozzle mounted on said base and adapted to project a stream of abrasive particles against the rotor of one of said ganged capacitors when said ganged capacitor is in said position on said base, means mounted on said shaft for indexing said ganged capacitor rotors and said differential capacitor rotors simultaneously to corresponding angular positions, and means operated by said bridge for initiating indexing movement when said bridge is balanced.

References Cited in the file of this patent

UNITED STATES PATENTS

| | | |
|---|---|---|
| 2,023,494 | Strieby | Dec. 10, 1935 |
| 2,340,843 | Bailey | Feb. 1, 1944 |
| 2,345,648 | Wolfskill | Apr. 4, 1944 |
| 2,474,883 | Zenor | July 5, 1949 |
| 2,495,269 | Lindmark | Jan. 24, 1950 |
| 2,565,341 | Arispe | Aug. 21, 1951 |